(12) United States Patent
Cu Castro

(10) Patent No.: US 11,290,445 B2
(45) Date of Patent: Mar. 29, 2022

(54) ONLINE AUTHENTICATION SYSTEMS AND METHODS

(71) Applicant: AXOS BANK, San Diego, CA (US)

(72) Inventor: Carlos M. Cu Castro, Los Angeles, CA (US)

(73) Assignee: AXOS BANK, San Diego, CA (US)

( * ) Notice: Subject to any disclaimer, the term of this patent is extended or adjusted under 35 U.S.C. 154(b) by 422 days.

(21) Appl. No.: 16/538,122

(22) Filed: Aug. 12, 2019

(65) Prior Publication Data

US 2021/0051142 A1  Feb. 18, 2021

(51) Int. Cl.
*H04L 29/06* (2006.01)
*G06F 9/451* (2018.01)

(52) U.S. Cl.
CPC .......... *H04L 63/0838* (2013.01); *G06F 9/452* (2018.02); *H04L 63/0861* (2013.01)

(58) Field of Classification Search
None
See application file for complete search history.

(56) References Cited

U.S. PATENT DOCUMENTS

| | | |
|---|---|---|
| 8,281,375 B2 | 10/2012 | von Krogh |
| 8,370,899 B2 | 2/2013 | Shoval et al. |
| 8,543,829 B2 | 9/2013 | von Krogh |
| 8,799,666 B2 | 8/2014 | Kesanupalli et al. |
| 8,904,495 B2 | 12/2014 | Baghdasaryan et al. |
| 8,973,114 B2 | 3/2015 | von Krogh |
| 9,398,003 B2 | 7/2016 | von Krogh |
| 9,479,497 B2 | 10/2016 | von Krogh |
| 9,680,825 B2 | 6/2017 | von Krogh |
| 10,084,774 B2 | 9/2018 | von Krogh |
| 2008/0040262 A1 | 2/2008 | D K et al. |
| 2008/0168543 A1 | 7/2008 | von Krogh |
| 2008/0168544 A1 | 7/2008 | von Krogh |
| 2011/0082791 A1 | 4/2011 | Baghdasaryan et al. |
| 2011/0082800 A1 | 4/2011 | Baghdasaryan et al. |

(Continued)

FOREIGN PATENT DOCUMENTS

KR  10-2015-0053663  5/2015

OTHER PUBLICATIONS

International Search Report in PCT/US2019/046137 dated May 12, 2020.
Written Opinion in PCT/US2019/046137 dated May 12, 2020.

*Primary Examiner* — Piotr Poltorak
(74) *Attorney, Agent, or Firm* — DLA Piper LLP US

(57) ABSTRACT

A server may include at least one server processor configured to execute an application. A desktop virtualization system may include at least one desktop virtualization processor. The desktop virtualization processor may be configured to instantiate a virtual desktop; authenticate a user of a client device; in response to authenticating the user of the client device, place the client device in communication with the virtual desktop through at least one network; launch a secure browser in the virtual desktop; and using the secure browser, place the client device in communication with the server through the at least one network. The application may be configured to perform processing in response to at least one command from the client device. The processing may include generating a one-time passcode, establishing a code word not communicated through the at least one network, and sending a message including the one-time passcode to a sender client device.

18 Claims, 6 Drawing Sheets

(56) References Cited

U.S. PATENT DOCUMENTS

| | | |
|---|---|---|
| 2011/0082801 A1 | 4/2011 | Baghdasaryan et al. |
| 2011/0082802 A1 | 4/2011 | Baghdasaryan et al. |
| 2011/0083016 A1 | 4/2011 | Kesanupalli et al. |
| 2011/0083018 A1 | 4/2011 | Kesanupalli et al. |
| 2011/0083170 A1 | 4/2011 | Kesanupalli et al. |
| 2011/0083173 A1 | 4/2011 | Baghdasaryan et al. |
| 2011/0138450 A1 | 6/2011 | Kesanupalli et al. |
| 2012/0042365 A1 | 2/2012 | Shoval et al. |
| 2013/0014237 A1 | 1/2013 | von Krogh |
| 2013/0347093 A1 | 12/2013 | von Krogh |
| 2015/0172282 A1 | 6/2015 | von Krogh |
| 2016/0308857 A1 | 10/2016 | von Krogh |
| 2016/0350750 A1 | 12/2016 | Kim |
| 2017/0279796 A1 | 9/2017 | von Krogh |
| 2018/0367531 A1 | 12/2018 | von Krogh |

ONLINE AUTHENTICATION SYSTEMS AND METHODS

DETAILED DESCRIPTION OF SEVERAL EMBODIMENTS

Figure 1:
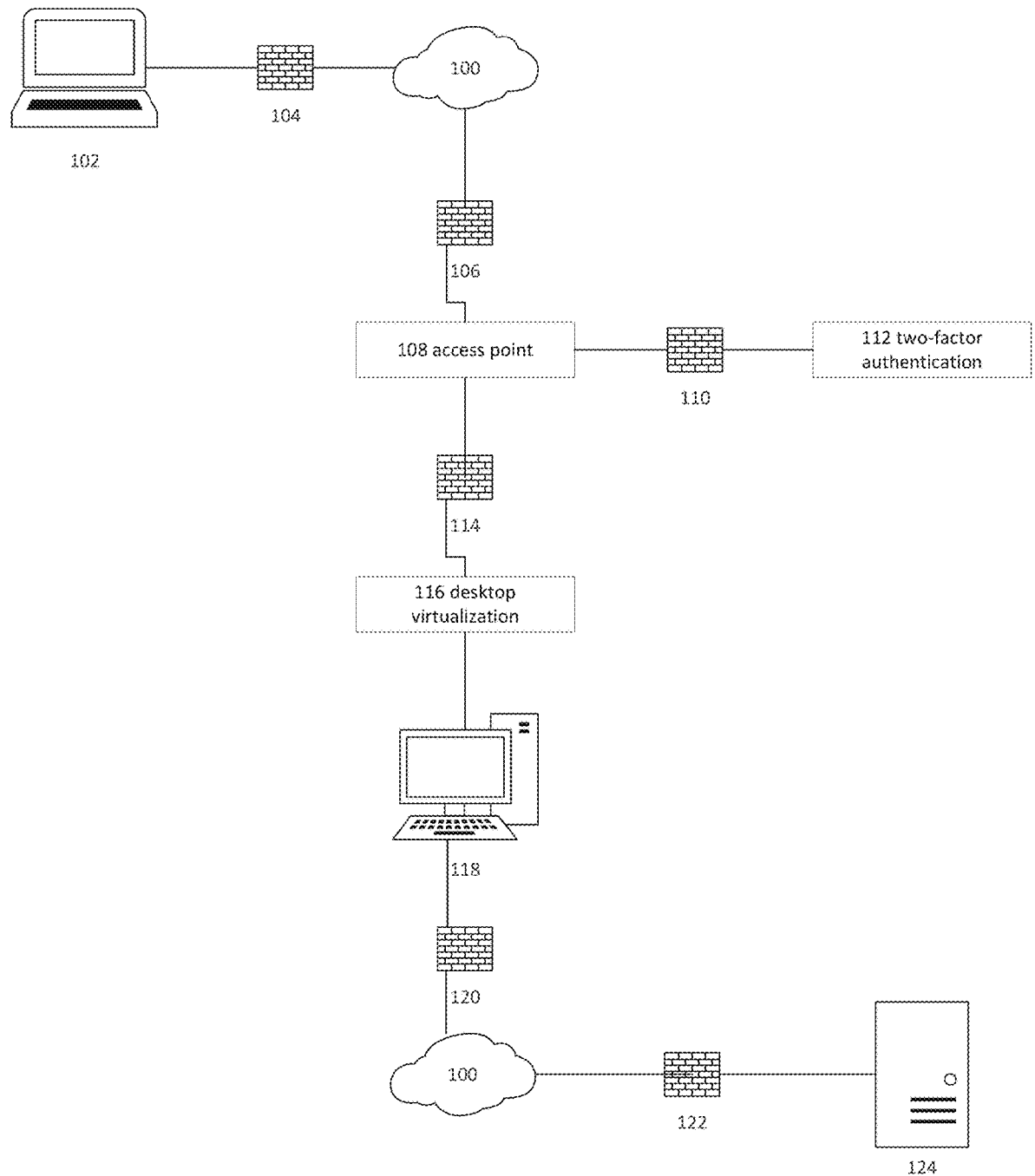
FIG. 1 shows a network according to an embodiment of the disclosure.

Some embodiments described herein may provide secure authentication for remote users/and or devices in a network computing environment. FIG. 1 shows a network 100 according to an embodiment of the disclosure. For example, computing devices may remotely connect to one another through a network 100 such as the Internet or other public and/or private networks. Computing devices that may communicate using network 100 may include one or more client devices 102. Client devices 102 may include, for example, dedicated client access devices (e.g., a personal computer configured to provide access to other devices in FIG. 1 and/or a thin client access workstation). In some embodiments, client devices 102 may be any computing devices that may be configured to perform the data communication functions described below, such as personal computers and/or laptops using Microsoft Windows™, Apple iOS™, and/or other operating systems.

As described further in relation to FIG. 3 below, client devices 102 may communicate with one or more access points 108, which may use two-factor authentication services 112 and/or other authentication systems and methods to authenticate users of client devices 102. For example, access points 108 may be configured to provide access to VMWare™ Horizon View™ software or similar software and, in some embodiments, may be part of the VMWare™ Horizon View™ software or similar software package. Authentication services 112 may be based on Rivest Shamir Aldeman (RSA) key soft token technology, lightweight directory access protocol (LDAP) technology, and/or other key generation systems. In some embodiments, authentication may be performed using biometrics. For example, client devices 102 may be equipped with facial scanning cameras, fingerprint readers, and/or other sensors. Client devices 102 may send biometric data of a user obtained by the sensors to access points 108, which may authenticate users who are recognized as legitimate users based on the biometric data.

As described further in relation to FIG. 3 below, once a client device 102 user has been authenticated by access point 108, client device 102 may connect to desktop virtualization system 116. For example, desktop virtualization system 116 may include one or more computers operating VMWare™ Horizon View™ software or similar software. Desktop virtualization system 116 may provide a pool of virtual desktops 118. Client device 102 may connect an available virtual desktop 118 from the pool. Due to the authentication performed by access point 108 and authentication service 112, client device 102 may at this point be securely connected and authenticated to a secure computing environment provided by virtual desktop 118.

As described further in relation to FIG. 3 below, virtual desktop 118 may include a secure virtual browser that may be configured to connect with server 124 over network 100. Accordingly, a user of client device 102 may use virtual desktop 118 to authenticate to server 124 within the secure computing environment provided by virtual desktop 118. For example, this may be useful for embodiments wherein server 124 is configured to handle sensitive data. In some embodiments, server 124 may be an online banking server configured to perform online banking services for the user of client device 102 who has authenticated to server 124 through virtual desktop 118, for example.

The connections between the devices described above may be provided and/or secured by various network hardware and/or software elements. For example, client device 102 and virtual desktop 118 may communicate using network 100 through respective routers 104 and 120 and/or other associated network equipment. Sensitive data may be protected by providing external firewalls 106 and 122 between network 100 and access point 108 and server 124, respectively. To further secure sensitive data, internal firewalls 110 and 114 may protect connections between access point 108 and authentication services 112 and desktop virtualization system 116, respectively.

The system arrangement of FIG. 1 may provide unique and specific features that may enhance security and connectivity. For example, through the combination of virtual and physical infrastructure elements illustrated in FIG. 1, some embodiments may improve authentication and communication security by gathering and processing sensitive user data (e.g., authentication data used to authenticate to server 124) in a computing environment which itself provides enhanced security. All applications that perform computing functions (e.g., banking functions) may be on server 124 side, so server 124 may be the only device in network 100 that processes sensitive data. In some embodiments, because client device 102 may be configured only as an access point to the rest of the devices available through network 100 (e.g., desktop device 118 and/or server 124), the system arrangement of FIG. 1 may prevent or reduce instances of malware being transmitted to the devices available through network 100 (e.g., desktop device 118 and/or server 124). For example, the user of client device 102 may not be presented with options to run software that can acquire malware either locally or at virtual desktop 118 (e.g., by being presented only with login options for connecting, ultimately, to server 124), and may therefore be restricted from obtaining malware that can be passed to server 124. In some embodiments, client device 102 may be configured or configurable to only provide functionality for connecting to other network 100 devices to the end user, with no other computing functions (e.g., other software packages) available for use, which may further prevent unwanted attacks or access attempts made through other software packages.

Figure 2:
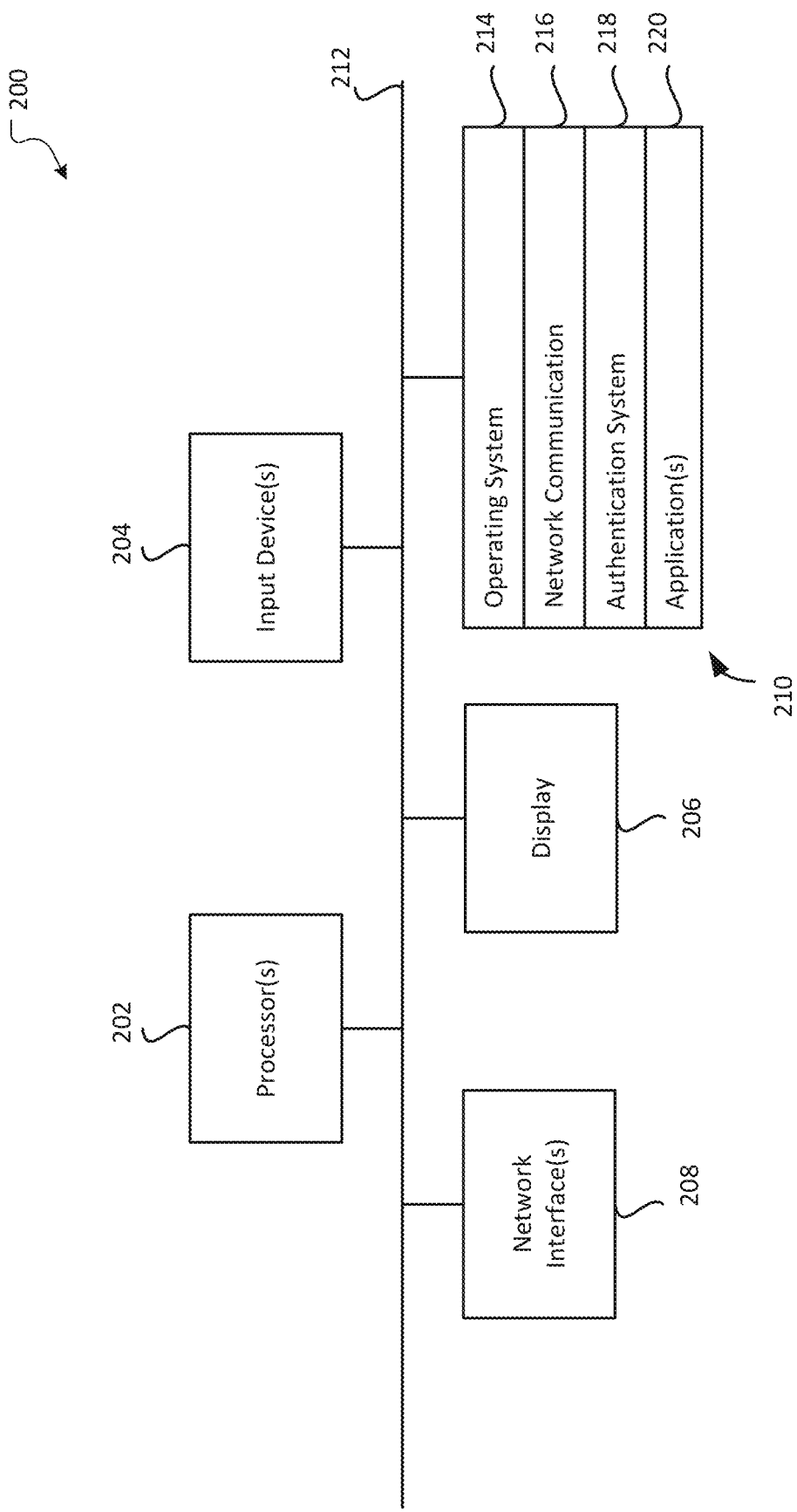
FIG. 2 shows a computing device according to an embodiment of the disclosure.

FIG. 2 shows a computing device 200 according to an embodiment of the disclosure. For example, computing device 200 may function as one or more of the devices connected to network 100 described above, such as client device 102, access point 108, desktop device 118, server 124, and/or one or more of routers 104, 120 and/or firewalls 106, 110, 114, 122. The computing device 200 may be implemented on any electronic device that runs software applications derived from compiled instructions, including without limitation personal computers, servers, smart phones, media players, electronic tablets, game consoles, email devices, etc. In some implementations, the computing device 200 may include one or more processors 202, one or more input devices 204, one or more display devices 206, one or more network interfaces 208, and one or more computer-readable mediums 210. Each of these components may be coupled by bus 212, and in some embodiments, these components may be distributed among multiple physical locations and coupled by a network.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, NuBus, USB, Serial ATA or FireWire. Computer-readable medium 210 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

Authentication system instructions 218 may include instructions for performing the secure authentication processing described herein, for example one or more portions of processes 300 and/or 400 described below.

Application(s) 220 may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer. In some embodiments, input devices may include biometric sensors such as cameras that may scan faces and/or fingerprint sensors.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 3:
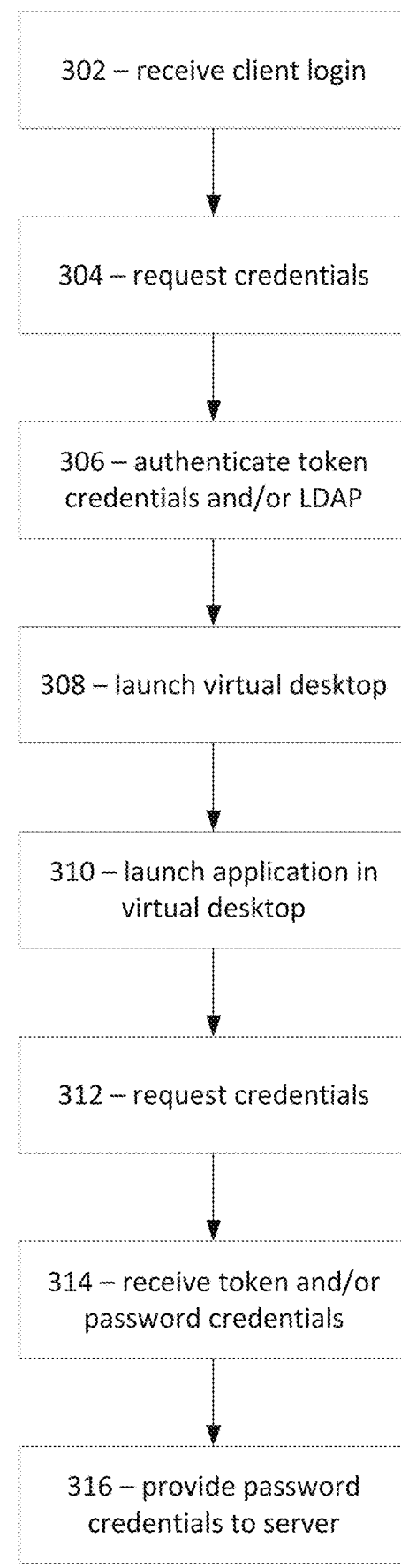
FIG. 3 shows an authentication method according to an embodiment of the disclosure.

FIG. 3 shows an authentication method 300 according to an embodiment of the disclosure. Some or all of the elements shown in FIG. 1 and communicating using network 100 may perform method 300 to securely authenticate a user of client device 102 with server 124 and/or to facilitate additional end-to-end communications between client device 102 and server 124. For example, internal elements such as the access point 108, authentication services 112, desktop virtualization system 116, and/or virtual desktop 118 may be secured (e.g., behind firewalls as described above) and may perform method 300. Method 300 may provide a unique procedure for high-security communications that improves upon the security afforded by less rigorous authentication techniques.

At 302, client device 102 may receive client login data. For example, a user may log into client device 102 locally. For example, some embodiments may include client devices 102 set up so that a user is required to log into the device locally to continue. Examples may include Mac and/or PC devices which may prompt a user to log into the desktop locally. After logging in, the user may be able to initiate access point 108 connection functionality, or access point 108 connection functionality may be triggered automatically upon login. In other embodiments, such as when client device 102 is a thin client dedicated to providing access to access point 108 and further functions of process 300, no login may be required, and client device 102 may present access point 108 connection functionality without login. In some embodiments, the client login may time out after a period of time, which may safeguard against unauthorized users from accessing client device 102 functionality after authorized users leave client device 102 unattended.

After the user logs in (for embodiments wherein login is required), client device 102 may connect to access point 108 through network 100. For example, if access point 108 is an access point to a VMWare™ Horizon View™ system as described above, client device 102 may launch a VMWare™ Horizon View™ client and use the client to connect to access point 108.

At 304, access point 108 may request credentials from client device 102. For example, access point 108 may require the user to authenticate using a two-factor authentication procedure in some embodiments. Accordingly, access point 108 may direct authentication services 122 to provide a soft token (such as a multi-character code, for example) to the user. For example, authentication services 122 may push or otherwise send a soft token to client device 102, or a user's personal device (e.g., a smart phone, tablet, laptop, personal computer, smart watch, etc.), or a combination thereof. Access point 108 and/or authentication services 122 may request a one-time passcode from the user. For example, access point 108 and/or authentication services 122 may cause client device 102 to display instructions to the user to enter the one-time passcode and send it to access point 108 and/or authentication services 122 through network 100. In some embodiments, the one-time passcode may be the soft token. In some embodiments, the one-time passcode may be the soft token plus some additional information, such as a user-specific PIN and/or password.

At 306, access point 108 and/or authentication services 122 may receive token credentials, which may include the one-time passcode. For example, the user may enter the one-time passcode into a user interface field provided by client device 102 in response to receiving the request at 304. In some embodiments, the user may also enter a username, which may allow access point 108 to identify an account for which access is being requested, for example. Client device 102 may send the one-time passcode, and username where applicable, to access point 108. Access point 108 may pass control over to authentication services 122 in response to receiving the one-time passcode. In some embodiments, client device 102 may send the one-time passcode, and username where applicable, directly to authentication services 122. Authentication services 122 may authenticate the one-time passcode.

In some embodiments, access point 108 may require the user to authenticate using biometric data. Client device 102 may be equipped with facial scanning cameras, fingerprint readers, and/or other sensors. Client device 102 may display instructions for submitting biometric data (e.g., directing the user to look at a camera or place a finger on a fingerprint reader). Client device 102 may gather biometric data using the sensor(s) and send the data, and username where applicable, to access point 108. Access point 108 may have access to user registration data (e.g., previously obtained user facial scans, fingerprint scans, or other biometric data associated with the user's account in a registration process). Access point 108 may analyze the biometric data from client device 102 to determine whether it matches the biometric data in the user registration data (e.g., corresponding to the username) for the user attempting to access server 124. If the biometric data from client device 102 is verified as belonging to the user, access point 108 may authenticate the user.

In some embodiments, access point 108 may require an additional authentication factor, such as lightweight directory access protocol (LDAP) credentials, from the user. If so, access point 108 may request these additional credentials from client device 102 and authenticate them when they are received. For example, as with the token credentials, client device 102 may prompt for the LDAP credentials, the user may enter the LDAP credentials, and client device 102 may send the LDAP credentials to access point 108 for verification. In some embodiments, the access point login may time out after a period of time, which may safeguard against unauthorized users from accessing access point 108 functionality after authorized users leave client device 102 unattended.

At 308, after the user has been authenticated, the user may be connected with a virtual desktop. For example, desktop virtualization system 116 may launch and/or select an available virtual desktop 118 and provide client device 102 with access to virtual desktop 118. In some embodiments, virtual desktop 118 may be a Microsoft Windows 10™ virtual desktop, for example, although virtual desktops 118 based on other operating systems may be used in some embodiments. Virtual desktop 118 may provide access to a secure browser application. In some embodiments, virtual desktop 118 may be dedicated only to accessing the secure browser application, and may not provide any other applications to the user.

At 310, virtual desktop 118 may launch the secure browser application. The secure browser application may be a virtual browser. The secure browser application may be a dedicated application for accessing a particular server (e.g., server 124) or, in some embodiments, may be a general purpose browser. Virtual desktop 118 may launch the secure browser application in response to a user command submitted through client device 102 to virtual desktop 118. For example, client device 102 may present a user interface showing the virtual desktop 118 user interface, which may include an icon or other selectable element that may cause virtual desktop 118 to launch the secure browser application in response to being clicked or otherwise selected. In some embodiments, virtual desktop 118 may automatically launch the secure browser application upon virtual desktop 118 launch.

At 312, the secure browser application running on virtual desktop 118 may request credentials from client device 102. For example, the secure browser application running on virtual desktop 118 may require the user to authenticate using a two-factor authentication procedure in some embodiments. Accordingly, the secure browser application running on virtual desktop 118 may direct authentication services 122 to provide a soft token (such as a multi-character code, for example) to the user. For example, authentication services 122 may push or otherwise send a soft token to client device 102, or a user's personal device (e.g., a smart phone, tablet, laptop, personal computer, smart watch, etc.), or a combination thereof. The secure browser application running on virtual desktop 118 and/or authentication services 122 may request a one-time passcode from the user. For example, the secure browser application running on virtual desktop 118 and/or authentication services 122 may cause client device 102 to display instructions to the user to enter the one-time passcode and send it to the secure browser application running on virtual desktop 118 108 and/or authentication services 122 through network 100. In some embodiments, the one-time passcode may be the soft token. In some embodiments, the one-time passcode may be the soft token plus some additional information, such as a user-specific PIN and/or password. Similarly to 306 described above, the credentials may be authenticated, allowing the user to access the secure browser application running on virtual desktop 118.

At 314, the secure browser application running on virtual desktop 118 may request credentials from client device 102 in order to access server 124. For example, a user interface provided in the secure browser application may be visible in the virtual environment that, in turn, may be displayed in a user interface of client device 102. The user interface in the secure browser application may include fields for entering account credentials, such as a username and/or password for an account handled by server 124. For example, server 124 may be a banking server, and the user may enter a username and password for accessing a bank account.

At 316, the secure browser application running on virtual desktop 118 may receive the user's input of the credentials and provide the credentials to server 124. Server 124 may authenticate the credentials and, if the credentials are successfully authenticated, provide access to secure information on server 124 through the secure browser application running on virtual desktop 118. In the example wherein server 124 is a banking server, the user may then engage in any online banking activities, such as wire transfer, account modification, etc. through the secure environment provided by the combination of authentication actions performed in process 300. Accordingly, process 300 may safeguard sensitive data stored by server 124 with much stronger protections than other authentication processes with fewer process elements and/or involving fewer hardware and/or software elements. In some embodiments, the server login may time out after a period of time, which may safeguard against unauthorized users from accessing server 124 functionality after authorized users leave client device 102 unattended.

In some embodiments, the secure browser application may provide various functionality in addition to providing access to the secure information. For example, the secure browser application may provide functionality for facilitating secure wire transfers. Bank account holders may use wire transfers to send money from their account to another account for any reason. Examples may include, but are not limited to, real estate settlements (escrow and title), trust payments, investment payments, auction payments, gambling payments, bankruptcy payments, etc. However, account holders sending money via wire transfer are frequent targets of fraud attempts, wherein others misrepresent themselves as the intended recipient of the money and provide wire transfer instructions that route the transfer to an account different from the account the sender intends. To combat this fraud, the secure browser application may provide an interface allowing a genuine recipient to securely provide genuine wire transfer instructions to a sender.

Figure 4A:
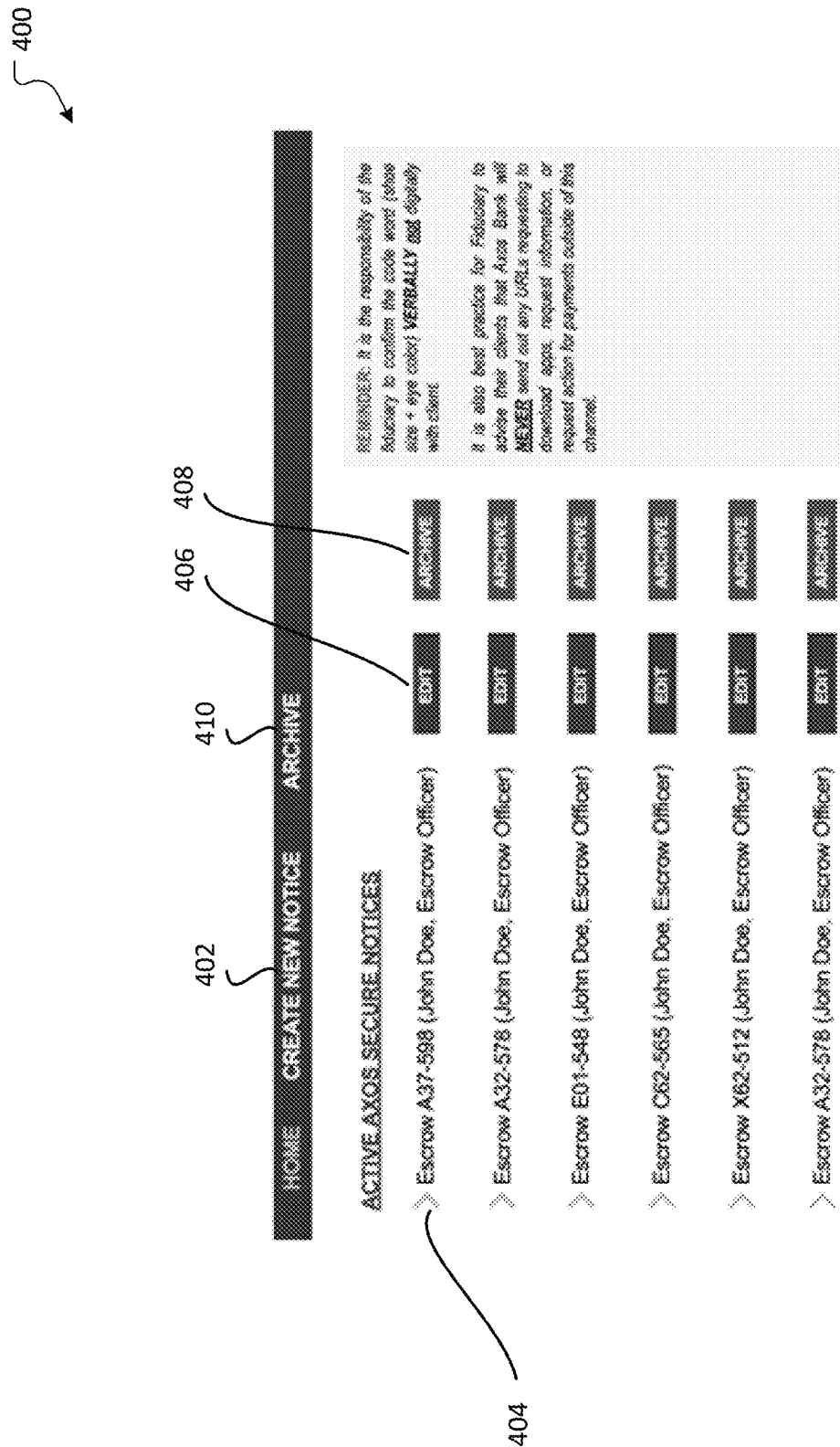
FIGS. 4A and 4B show a secure wire transfer interface according to an embodiment of the disclosure.
Figure 4B:
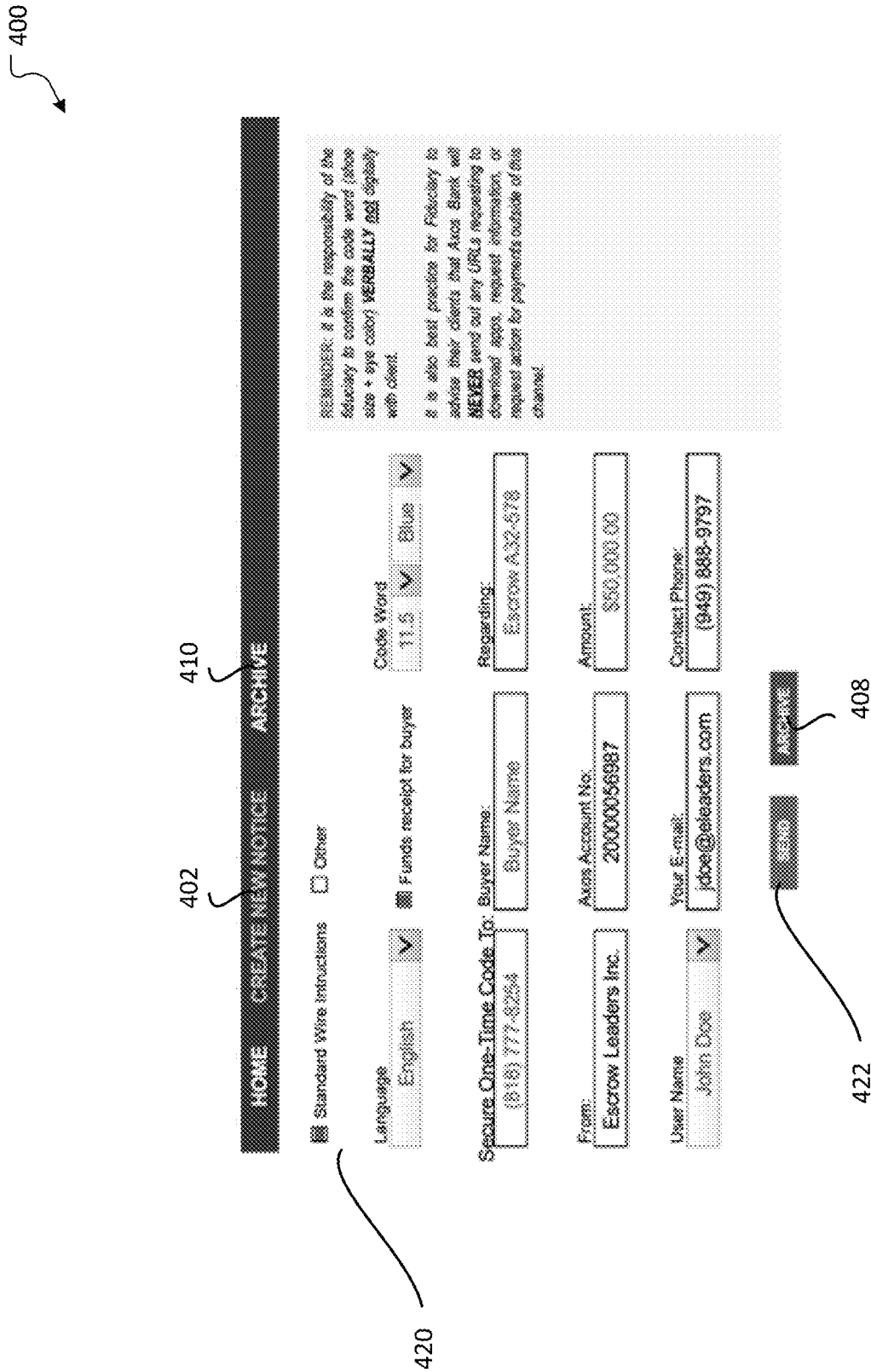
Figure 5:
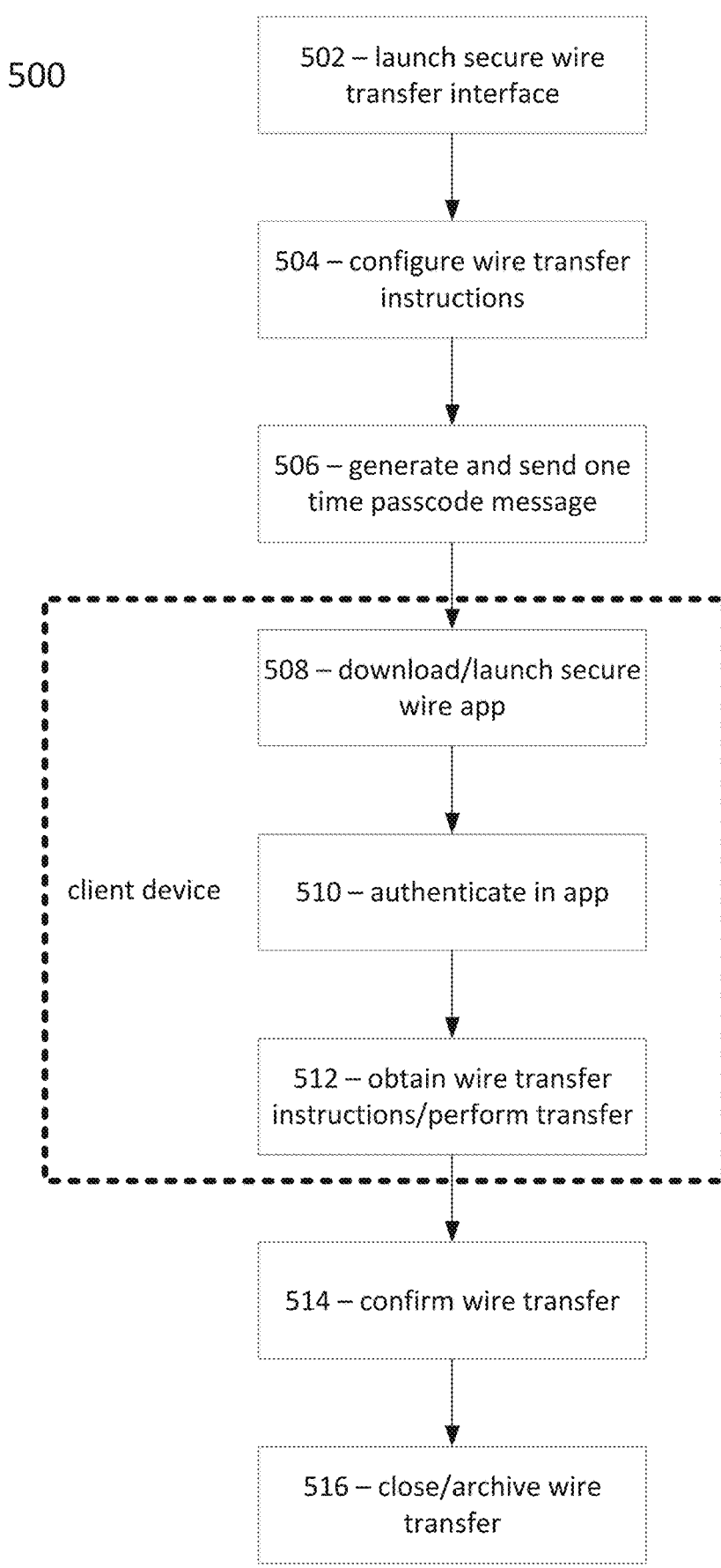
FIG. 5 shows a secure wire transfer method according to an embodiment of the disclosure.

FIGS. 4A and 4B show a secure wire transfer interface 400 according to an embodiment of the disclosure. A user may use interface 400 to establish wire transfer instructions and trigger messages to client devices prompting users of the client devices to securely obtain the wire transfer instructions. FIG. 5 shows a secure wire transfer method 500, according to an embodiment of the disclosure, that may incorporate interface 400. Portions of interface 400 that are used within method 500 are described in the context of method 500 below.

At 502, the user may launch the secure wire transfer interface 400, for example by selecting an option presented within the secure browser after process 300 provides access as described above. Server 124 may present interface 400 to the user. In some embodiments, interface 400 may be an HTML or other interface that is specific to the user who has logged in. Interface 400 may be configured to capture information that may be used to initiate wire instruction(s) to buyer/wire senders. These wire instructions may be made available to the buyer/wire senders via a wire transfer app (e.g., Android/iOS app), as described below. Information collected through interface 400 may be parsed and stored in server 124 and/or may be sent to other services depending on the information needed throughout the authentication steps of the wire transfer app, for example.

At 504, the wire transfer instructions may be configured. Within interface 400, a user may be able to select an option to create a new notice 402 or, for one or more existing notices 404 that may be displayed, an option to edit the existing notice 406. Upon creation of a new notice or selection of an existing notice for editing, interface 400 may display a form 420. Form 420 may include one or more selectable options and/or fillable fields for gathering information that may be used to prepare wire transfer instructions. For example, form 420 may be configured to receive information identifying the sender (e.g., sender name, phone number, etc.), a purpose for the wire transfer, an amount to be transferred, information identifying the recipient (e.g., agent name, company name, account number, escrow number or other identifier, email address, phone number, etc.), authentication information (e.g., a code word such as the combination of shoe size and eye color shown in FIG. 4B or another code word), and/or other options. A user may enter such information and then select a send option 422 to advance process 500.

At 506, server 124 may generate and send a message to the sender identified at 504. For example, the message may be an SMS text message, MMS text message, or other message sent to the phone number of the sender entered into form 420. The message may include instructions to obtain or launch the wire transfer app. The message may include a one-time passcode automatically generated by server 124, such as a sequence of numbers and/or letters. In some embodiments, the one-time passcode may expire after a prescribed length of time, and this prescribed length of time may be indicated in the message in some cases.

For example, a message may read as follows, with information in parentheses being entered through form 420 and/or automatically generated by server 124. "(Agent name) from (company name) has sent you payment information. Your one-time secure code is (one-time passcode). This code will expire in (prescribed length of time) Please go to the (name of app) to view instructions. (Name of app) is available in your device's app store."

At 508, a sender client device configured to receive messages sent to the phone number used at 506 may receive the message (e.g., the SMS or MMS message). The text message may deliberately omit URL links to locations from which the app can be downloaded and/or to the app itself. The lack of links may minimize the potential for fraudsters to mimic the process and thereby convey fraudulent wire instructions to senders.

Upon receiving the text message, the user of the sender client device may download and install the app as instructed in the text message if the app is not already present on the device. After installation, or if the app is already present, the user may launch the app.

At 510, the app may be launched in the sender client device and may present a user interface. The user interface may include a field for entering security elements such as the one-time passcode and the code word specified at 504. In some embodiments, these may be entered on a same page, and in other embodiments, a user may enter one of these elements first and then, after that element is verified by the app, enter the second element. The code word may be known to the user of the app based on verbal communication with the user of interface 400, but may not be communicated electronically at any point in process 500, thereby minimizing the potential for fraudsters to mimic the process and thereby convey fraudulent wire instructions to senders.

The app may authenticate the information entered by the user. In some embodiments, this may include the client device communicating with server 124 by one or more networks to match the one-time passcode against an entry in a database maintained by server 124. The database may specify an active one-time passcode associated with the message sent to the client device and the account of the user who configured the wire transfer instructions at 504. If the passcodes match, server 124 may also compare the code word entered into the app to the code word specified at 504. If these code words match, process 500 may continue. If not, the app may offer repeat opportunities to enter the code word in some embodiments. After a certain number of repeat attempts without success, the app may present a message directing the user to communicate directly with the recipient (e.g., by phone or in person) to receive wire instructions.

At 512, if authentication succeeds at 510, server 124 may send wire instructions configured at 504 to the sender client device. The sender client device may display the instructions, which may be accessed, printed, and/or emailed from the app in some embodiments. The user may use the instructions to wire the money according to the instructions through a banking app or other money wiring system or method of their choice.

At 514, in response to a successful wire transfer (not shown), the wire transfer may be confirmed. For example, server 140 may analyze incoming wire transfers to the account of the user of interface 400. Server 140 may compare information included in incoming wire transfers (e.g., escrow number or other identifier) to equivalent information (e.g., escrow number or other identifier) entered at 504. In response to detecting a positive match, server 140 may determine that the wire transfer is complete. Server 140 may notify the receiver user through interface 400 and/or may send a confirmation message (e.g., SMS or MMS message) to the sender client device to notify the sender that the transfer is complete.

At 516, once the transfer is complete, the user of interface 400 may be able to close and/or archive the wire transfer entry. For example, interface 400 may include an archive option 408 selectable from the list of existing notices 404 (e.g., FIG. 4A) and/or from the form 420 for a notice (e.g., FIG. 4B). Selection of the archive option 408 may trigger server 140 to perform a closure of the wire instructions. This may cause the sender's app to enter a "need authentication" state requiring a new one-time passcode since there may be no active wire Instructions for the sender to access.

Process 500 has been presented as being performed, in part, through the use of interface 400 which is accessible through the secure browser described above. Accordingly, access to interface 400 and performance of process 500 may be restricted to cases wherein process 300 has been successfully performed and access to the secure browser has been thereby granted. However, in alternate embodiments, it may be possible to perform process 500 (including, in some embodiments, presenting and using interface 400) without first performing process 300. For example, access to interface 400 may be enable through other access, login, and/or verification techniques.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. An authentication system comprising:
   a server including at least one server hardware processor configured to execute an application; and
   a desktop virtualization system including at least one virtualization system hardware processor configured to:
   instantiate a virtual desktop;
   authenticate a user of a client device by:
   causing an authentication service to issue a one-time passcode for the user,
   receiving the one-time passcode from the client device, and
   determining that the one-time passcode from the client device matches the one-time passcode issued by the authentication service;

in response to authenticating the user of the client device, place the client device in communication with the virtual desktop through at least one network;
launch a secure browser in the virtual desktop;
using the secure browser, place the client device in communication with the server through the at least one network;
in response to at least one command from the client device sent through the secure browser of the virtual desktop:
generate a one-time passcode,
establish a code word not communicated through the at least one network, and
send a message including the one-time passcode to a sender client device;
confirm entry of the one-time passcode and the code word by a user of the sender client device; and
in response to confirming the entry, providing wire transfer instructions to the sender client device.

2. The authentication system of claim 1, further comprising the client device including at least one client hardware processor.

3. The authentication system of claim 2, wherein the at least one client hardware processor is configured to:
perform processing associated with authenticating the user and sending the at least one command; and
prevent processing associated with tasks unrelated to the processing associated with authenticating the user and sending the at least one command.

4. The authentication system of claim 2, wherein the client device comprises at least one biometric sensor.

5. The authentication system of claim 4, wherein the at least one virtualization system hardware processor is further configured to authenticate the user by:
receiving biometric data from the at least one biometric sensor; and
determining that the biometric data matches known biometric data of the user.

6. The authentication system of claim 5, wherein the at least one virtualization system hardware processor is further configured to authenticate the user by:
receiving additional credentials from the client device; and
determining that the additional credentials match known credentials of the user.

7. The authentication system of claim 1, wherein the at least one virtualization system hardware processor is further configured to authenticate the user by:
receiving additional credentials from the client device; and
determining that the additional credentials match known credentials of the user.

8. The authentication system of claim 1, wherein the at least one virtualization system hardware processor is further configured to authenticate the user by:
receiving biometric data from the client device; and
determining that the biometric data matches known biometric data of the user.

9. The authentication system of claim 8, wherein the at least one virtualization system hardware processor is further configured to authenticate the user by:
receiving additional credentials from the client device; and
determining that the additional credentials match known credentials of the user.

10. The authentication system of claim 1, wherein the at least one server hardware processor is configured to:
receive user authentication information from the secure browser; and
prior to performing the processing in response to the at least one command, validating the user authentication information.

11. The authentication system of claim 1, wherein the message does not include the code word.

12. An authentication method comprising:
instantiating, by at least one virtualization system hardware processor, a virtual desktop;
authenticating, by the at least one virtualization system hardware processor, a user of a client device, the authenticating comprising:
causing an authentication service to issue a one-time passcode for the user,
receiving the one-time passcode from the client device, and
determining that the one-time passcode from the client device matches the one-time passcode issued by the authentication service;
in response to authenticating the user of the client device, placing, by the at least one virtualization system hardware processor, the client device in communication with the virtual desktop through at least one network;
launching, by the at least one virtualization system hardware processor, a secure browser in the virtual desktop;
using the secure browser, placing, by the at least one virtualization system hardware processor, the client device in communication with a server through the at least one network;
performing, by at least one server hardware processor, processing in response to at least one command from the client device sent through the secure browser of the virtual desktop, the processing including:
generating a one-time passcode,
establishing a code word not communicated through the at least one network, and
sending a message including the one-time passcode to a sender client device;
confirming, by the at least one server hardware processor, entry of the one-time passcode and the code word by a user of the sender client device; and
in response to confirming the entry, providing, by the at least one server hardware processor, wire transfer instructions to the sender client device.

13. The authentication method of claim 12, further comprising:
performing, by at least one client hardware processor, processing associated with authenticating the user and sending the at least one command; and
preventing, by the at least one client hardware processor, processing associated with tasks unrelated to the processing associated with authenticating the user and sending the at least one command.

14. The authentication method of claim 12, wherein the authenticating further comprises:
receiving biometric data from the client device; and
determining that the biometric data matches known biometric data of the user.

15. The authentication system of claim 14, wherein the authenticating further comprises:
receiving additional credentials from the client device; and
determining that the additional credentials match known credentials of the user.

16. The authentication method of claim 14, further comprising collecting, by at least one biometric sensor of the client device, the biometric data.

17. The authentication method of claim 12, wherein the authenticating further comprises:
   receiving additional credentials from the client device; and
   determining that the additional credentials match known credentials of the user.

18. The authentication method of claim 12, wherein the message does not include the code word.

* * * * *